US006312767B2

(12) United States Patent
Villermet et al.

(10) Patent No.: US 6,312,767 B2
(45) **Date of Patent: *Nov. 6, 2001**

(54) PROCESS AND DEVICE FOR THE SURFACE TREATMENT OF A SUBSTRATE BY AN ELECTRICAL DISCHARGE BETWEEN TWO ELECTRODES IN A GAS MIXTURE

(75) Inventors: Alain Villermet, Viroflay; François Coeuret, Guyancourt; Panayotis Cocolios, Bullion, all of (FR); Bernd Martens, Hamburg (DE); Eckhard Prinz, Hamburg (DE); Jürgen Salge, Hamburg (DE)

(73) Assignee: L'Air Liquide, Societe Anonyme pour l'Exploitation des Procedes Georges Claude, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,686

(22) Filed: Nov. 5, 1998

(30) Foreign Application Priority Data

Nov. 5, 1997 (FR) .................................................. 97 13910

(51) Int. Cl.[7] .............................. H05H 1/48; H05H 1/24; B05P 3/14; C08F 2/52; C08J 7/18

(52) U.S. Cl. .......................... 427/540; 427/534; 427/536; 427/539; 427/489; 427/488; 427/580; 427/491; 216/71; 134/1.1

(58) Field of Search .................................... 427/540, 539, 427/580, 569, 488, 489, 490, 491, 538, 534, 535, 536, 537; 118/718, 723 HC, 723 E; 216/71; 134/1.1

(56) References Cited

U.S. PATENT DOCUMENTS 3,068,510 * 12/1962 Coleman .............................. 427/488
3,376,208 * 4/1968 Wood .................................. 427/540
3,443,980 * 5/1969 McBride ............................. 427/540

(List continued on next page.)

FOREIGN PATENT DOCUMENTS 1779400 9/1971 (DE) .
3115958 12/1982 (DE) .
1100939 * 3/1961 (DE) .................................... 427/540

(List continued on next page.)

OTHER PUBLICATIONS

Translation of DE 001100939A by Eugen Sauter, Mar. 1961.*

Tanaka Megumi, "Surface Treatment of Plastic Film," JP 57 187328 (TORAY KK), Nov. 18, 1982, Patent Abstracts of Japan, vol. 007, No. 034 (C–150), Feb. 10, 1983.

G. M. Abbott, "The Corona Treatment of Cotton," *Textile Research Journal*, Feb. 1977, pp. 141–144.

*Primary Examiner*—Marianne Padgett
(74) *Attorney, Agent, or Firm*—Burns, Doane, Swecker & Mathis, L.L.P.

(57) ABSTRACT

A process for the surface treatment of a running substrate by an electrical discharge created between two roller electrodes, comprising a first roller electrode and a second roller electrode, in a gas mixture comprising the steps of passing the substrate in between the two roller electrodes by applying it against the first roller electrode; injecting the gas mixture between the rollers to apply a first surface treatment to the substrate; passing the substrate in between the two roller electrodes by applying it against a second roller electrode; and injecting the gas mixture between the rollers to apply a second surface treatment to the substrate.

7 Claims, 4 Drawing Sheets

U.S. PATENT DOCUMENTS

| | | | | |
|---|---|---|---|---|
| 3,482,092 | | 12/1969 | Luckey et al. . | |
| 3,730,753 | * | 5/1973 | Kerr . | |
| 3,740,325 | * | 6/1973 | Manion et al. | 427/540 |
| 3,959,104 | * | 5/1976 | Fales | 118/718 |
| 4,457,145 | * | 7/1984 | Sando et al. . | |
| 4,466,258 | * | 8/1984 | Sando et al. . | |
| 4,529,664 | * | 7/1985 | Hart . | |
| 5,053,246 | * | 10/1991 | Shutterworth et al. . | |
| 5,160,592 | * | 11/1992 | Spitsin et al. | 427/538 |
| 5,296,170 | * | 3/1994 | Noritsugu et al. | 427/540 |
| 5,437,725 | * | 8/1995 | Schuster et al. | 118/718 |
| 5,576,076 | | 11/1996 | Slootman et al. . | |
| 5,629,054 | * | 5/1997 | Kanai | 427/569 |
| 5,792,517 | * | 8/1998 | Takeuchi et al. | 427/580 |

FOREIGN PATENT DOCUMENTS

| | | | | |
|---|---|---|---|---|
| 1753895 | * | 9/1976 | (DE) | 427/540 |
| 0177364 | | 4/1986 | (EP) . | |
| 141121 | * | 5/1985 | (EP) | 427/540 |
| 1012746 | | 12/1965 | (GB) . | |
| 357187328 | * | 11/1982 | (JP) | 427/580 |

* cited by examiner

PROCESS AND DEVICE FOR THE SURFACE TREATMENT OF A SUBSTRATE BY AN ELECTRICAL DISCHARGE BETWEEN TWO ELECTRODES IN A GAS MIXTURE

BACKGROUND OF THE INVENTION

Field of the Invention

Device for the surface treatment of a substrate (3) by an electrical discharge between two electrodes in a gas mixture liable to generate by-products (powders, for example) which may be deposited on the electrodes, in which device one (9) of the electrodes is a roller against which the substrate may be applied, means being provided for rotating the roller and the substrate and for injecting the gas mixture between the electrodes, the device being noteworthy in that the second electrode is a roller electrode (11) against which the running substrate may also be applied, this roller (11) being placed parallel to the other roller (9) with a suitable gap. By virtue of this arrangement, the substrate (3) protects each electrode (11) and prevents it from being covered with powder during the treatment, as well as preventing the corresponding contamination, thereby allowing the device to operate continuously.

The present invention is a process and a device for the surface treatment of a running substrate by an electrical discharge in a controlled gaseous atmosphere between two electrodes, the gaseous atmosphere including, in particular, one or more compounds liable to generate by-products which can accumulate and/or be deposited on the discharge electrodes.

By way of illustration, these by-products may be solid, such as powders (as, for example, in the case of silanes), or else liquid or pasty, as in the case of certain hydrocarbons (giving rise, for example, to compounds having aliphatic chains being deposited).

It should be understood that such deposits can then accumulate on the electrodes and constitute an alteration of them and, more generally, a disturbance to the operation of the system.

Depending on the intended treatment and the intended substrate, the gas mixtures envisaged may vary greatly, these generally comprising an inert carrier gas and one or more compounds from among reducing and oxidizing gases, one of the components of the mixture therefore being of the type liable to generate by-products which can accumulate and/or be deposited on the discharge electrodes, as is the case, for example, with silanes or with hydrocarbons.

The <<substrates>> intended by the present invention may, for example, be in the form of sheet or film, or foam products, which may or may not be continuous depending on the material in question. Substrates of interest here are most particularly nonconducting substrates made of a polymer material, a <<woven or nonwoven>> textile material, a paper material, etc.

Taking the example of polymer films, it is known to be often necessary to carry out surface treatments on these polymer films in order to make their surface <<active>>, i.e. in order to make it possible to stick it, to print information on it, etc. In order to be able to print, the ink must be compatible with the surface of the polymer film, although initially this is not generally the case and although then a pretreatment of the surface is necessary.

In order to carry out a suitable treatment, it is known to subject the surface of the polymer film to a flame-brushing treatment, or to a treatment with suitable chemicals, or else to a corona treatment. Conventionally, these corona treatments are carried out in air, the nitrogen and oxygen molecules of which are converted by the electrical discharge, creating new molecules (radicals, ions, etc.) which react chemically with the surface of the polymer.

It has also been proposed, as described by U.S. Pat. No. 5,576,076, to replace the air with a gas mixture containing silane. Injecting this active gas mixture into the discharge zone makes it possible to obtain high treatment levels and therefore to solve a number of problems encountered by polymer film converters. The electrode system used contributes not only to creating the electrical discharge (as standard electrodes) but also to manage the injection of the treatment gases within the discharge zone.

The active gas mixture allowing correct treatment levels to be obtained may have various compositions, these essentially depending on the intended application of the treated polymer film. Hitherto, the gas mixture usually contained nitrogen as the carrier gas, an oxidizing gas and several hundreds of ppm of silane.

The work completed by the Applicant has made it possible to demonstrate that when this process is carried out as described in the aforementioned United States patent, namely that the active gas mixture containing silane and an oxidizing agent is injected into the discharge zone, silica powder is formed which accumulates on the electrodes throughout the duration of the treatment. This increasing contamination of the electrodes during the treatment prevents the surface treatment to be carried out under proper conditions over a longer time than approximately one hour, whereas the usual operating mode in industry is of the 24-hour continuous type.

The accumulation of powder on the electrodes is a consequence of various phenomena:

- the physico-chemistry of the electrical discharge: this is because the silica powder formed is the product of reactions taking place in the gas phase due to the excitation of the discharge. By altering the operating conditions (composition of the gas mixture, electrical characteristics of the discharge, etc.), it is possible to alter the amount of powder formed;
- the process whereby the powder formed is brought into contact with the electrodes: this is because, when the powder is formed in the gas phase (even in small optimized amounts, according to the previous paragraph), accumulation only occurs if the powder is brought into contact with the electrodes.

SUMMARY AND OBJECTS OF THE INVENTION

The object of the present invention is therefore especially to provide a process and a device allowing this technical problem to be advantageously solved by preventing accumulation on the electrodes of by-products (solid and/or liquid and/or else pasty by-products) resulting from the chemical reactions caused by the electrical discharge in the treatment atmosphere.

One of the conditions necessary for proper operation of the invention is to produce a device capable of ensuring homogeneous injection of the gas mixture over the entire length of the electrodes used to create the discharge. This is because a strictly homogeneous distribution is essential for obtaining homogeneous treatment of the polymer film.

According to the invention, the two electrodes are rollers against which the running film is applied, these being arranged so as to be parallel to each other with a suitable gap, and thus an electrical discharge is therefore created between two roller electrodes.

According to the invention, the process, for the surface treatment of a running substrate by an electrical discharge created between two electrodes in a gas mixture, liable to generate by-products which can be deposited on the electrodes, in which one of the electrodes is a roller against which the substrate may be applied, means being provided for injecting the gas mixture between the electrodes, is then a process wherein at least one stage for treating the substrate is used, each stage comprising at least one pair of roller electrodes and an injector for injecting the gas mixture between the rollers and wherein the treatment of the substrate is carried out in the following manner: the substrate is made to pass in succession a first time between the two roller electrodes, by applying it against the first roller electrode, where it undergoes a first surface treatment, and then a second time between the two roller electrodes, by applying it against the second roller electrode, where it undergoes a second surface treatment.

Moreover, the process according to the invention may adopt one or more of the following characteristics:

- the width of the substrate is at least equal to the length of the interelectrode space where the combination of the presence of an electrical discharge and the presence of said gas mixture liable to generate by-products is observed.
- deflector rolls are used, the number of deflector rolls used being at least sufficient to allow said first and second surface treatments to be carried out in the following manner:
  - i) the substrate is applied against a first deflector roll of a first pair of deflector rolls and then passes between the two roller electrodes by being applied against the first roller electrode, where it undergoes said first surface treatment;
  - j) next, the substrate is applied against a first deflector roll of a second pair of deflector rolls, before being applied against the second deflector roll of the second pair of deflector rolls;
  - k) the substrate then passes again between the two roller electrodes, by being applied against the second roller electrode, where it undergoes said second surface treatment, before being applied against the second deflector roll of the first pair of deflector rolls;
- two stages for treating the substrate are used and two additional surface treatments of the substrate are carried out, between said first surface treatment of the substrate and said second surface treatment of the substrate, in the second treatment stage in the following manner:
  - i) after having undergone said first surface treatment and before undergoing said second surface treatment, the substrate is made to pass a first time between the two roller electrodes of the second stage, by applying it against the first roller electrode of the second stage, where it undergoes a first additional surface treatment;
  - j) subsequently, the substrate is made to pass a second time between the two roller electrodes of the second stage, by applying it against the second roller electrode of the second stage, where it undergoes a second additional surface treatment.
- the length of at least one of the electrodes of said at least one pair is tailored to the width of the substrate to be treated;
- the gas mixture is injected between the two roller electrodes of said at least one pair, over an injection length substantially equal to the width of the substrate to be treated.

As will have been understood on reading the foregoing, the invention relates to the field of processes for treating a <<running>> surface, and therefore to plants that are termed <<open>>, hence the presence of certain intakes of air, the surface treatment also necessarily being carried out at atmospheric pressure or at a pressure close to atmospheric pressure. This is because it should be understood that, without departing from the scope of the present invention, it is possible to work at pressures within a few tens of millibars, or even a few hundreds of millibars, of atmospheric pressure.

The invention also relates to a device for the surface treatment of a running substrate by an electrical discharge created between two electrodes in a gas mixture liable to generate by-products which can be deposited on the electrodes, in which device one of the electrodes is a roller against which the substrate may be applied, means being provided for injecting the gas mixture between the electrodes, wherein the second electrode is a roller against which the running substrate may also be applied, which roller is arranged so as to be parallel to the other roller, with a suitable gap, by the fact that the device comprises means, capable of making the substrate pass a first time between the two roller electrodes, by applying it against a first roller electrode, where it may undergo a first surface treatment, and in subsequently making the substrate pass a second time between the two roller electrodes, by applying it against the second roller electrode, where it may undergo a second surface treatment.

The device according to the invention may also adopt one or more of the following characteristics:

- it comprises a cover comprising at least one stage for treating the substrate, each stage comprising a pair of roller electrodes and means for injecting a gas mixture between the roller electrodes;
- it comprises at least two pairs of deflector rolls, the number of pairs of deflector rolls of the device being at least sufficient to allow there to be one pair of deflector rolls on either side of each pair of roller electrodes;
- the means for injecting the gas mixture comprise, for each pair of roller electrodes, a gas injection nozzle extending continuously from one end of at least one of the associated roller electrodes to the other;
- the gas injection nozzle is provided with means for occluding part of the length of said nozzle so as to be able to adjust and limit the length over which the gas mixture is injected, and tailor, for example, this length to that of one or other of the electrodes;
- the length of at least one of the electrodes of the or each pair is equal to the width of the substrate to be treated;
- said occluding means comprise slats hinged laterally to the nozzle, each being provided with a curved end suitable for closing off the injection slot of the nozzle and with operating means, such as hooks;
- the device includes a suction unit for sucking out the gaseous effluents arising from the electrical discharge and for sucking out the air entrained by the substrate due to its running movement;
- the suction unit is placed under a pair of deflector rolls placed beneath the roller electrodes;
- the suction unit comprises, associated with each deflector roll of said pair, a system which includes a suction assembly and an intermediate assembly interposed between this suction assembly and the deflector roll in question and which has a concave surface conjugate with the cylindrical surface of the deflector roll, there being a suitable gap between these surfaces, and, provided in each assembly, there is a slot for sucking out the gaseous atmosphere flowing between the roll and the surface of the intermediate assembly, this slot emerging in the suction assembly.

As will have been understood on reading the foregoing, the device may also comprise means allowing the film to run through the device properly and therefore, in particular, allowing the substrate to be brought into the discharge zone and to be removed therefrom, or indeed, when the device has several treatment stages, allowing the substrate to be transferred between the stages.

These means of <<conveying>> the substrate may, as is very commonly the case, for example, on plants for treating the surface of polymer films, be deflection rolls.

If the device comprises two treatment stages, the second discharge may either be turned off or turned on, which means that the substrate may be treated twice or four times. This is because the substrate can firstly pass through the first discharge stage, where it is treated by the first discharge zone, and then, after the film has passed over a deflector roll, it can pass through the second discharge stage where it may again be treated by the second discharge zone (if the latter is turned on). After being deflected by other rolls, the film passes a second time through the second discharge zone and then, after a deflector roll, also through the first discharge zone.

As will have been understood on reading the foregoing, on the one hand the lengths of the two electrodes of the pair are not necessarily equal and, on the other hand, according to the invention the ratio of the dimensions between one or other of the electrodes and the substrate may be chosen. It is also possible to choose, according to the invention, the gas injection width with respect to the dimensions of the substrate to be treated.

Thus, depending on the choice of the configuration adopted, if the treatment gas mixture contains a gas liable to lead to the formation of by-products under the excitation of the electrical discharge (as is the case with silanes), the electrodes remain protected by the substrate itself throughout the duration of the treatment since the substrate covers all or part of the surface of the electrodes, i.e. of their <<working>> surface, in each electrical discharge zone, the formation of by-product deposits on the electrodes being in fact the result of both the presence of an electrical discharge and the presence of the gas mixture liable to generate by-products.

In order simply to illustrate the invention more clearly, i.e. this characteristic according to which the running substrate is applied against the two electrodes of the pair of roller electrodes facing each other, we consider here a given portion -X- of the running substrate, which is treated in a one-stage device: the portion -X- will pass a first time between the two roller electrodes and then be applied against a first roller electrode, where it undergoes a first surface treatment (at this moment, the second electrode facing it is covered by a downstream portion of the running substrate, i.e. a portion which preceded -X- in the run), and then -X- passes a second time between the two roller electrodes, being applied against the second roller electrode of the pair, where it undergoes a second surface treatment (at this moment, the first electrode previously mentioned is covered by an upstream portion of the running substrate, i.e. which followed -X- in the run).

Again in order to make the invention clearer:

i) if the length of at least one of the electrodes of the pair is tailored to the width of the substrate, this electrode will thus be protected from the deposits of by-products since it is covered by the substrate. As regards the second electrode, which faces it:
   - this is thus also protected if it has the same length as the first,
   - and if the length of the second electrode is greater, it is, of course, protected over the entire width of the substrate by being covered, and, with regard to its additional length with respect to the first electrode, this is not affected by deposits of by-products because of the absence of a discharge on this additional length;

j) as was seen previously, it is also possible to tailor the gas injection length to the width of the substrate to be treated—the electrodes will then also be protected from the deposits of by-products whatever the dimensional ratio between the electrodes and the substrate because:
   - that part of the electrodes which is covered by the substrate is thus protected;
   - that portion of the electrodes which would not be covered by the substrate (because a greater length was chosen) is also protected because of the absence of the gas mixture liable to lead to the formation of by-products, with regard to the portions in question.

In all cases, the by-products thus formed are immediately extracted by suction systems housed in the cover and/or the surface of the running substrate, without accumulating on the electrodes. Under these conditions, the system can operate practically continuously 24 hours a day.

Other features and advantages of the invention will appear in the course of the description which follows, given with reference to the appended drawings which illustrate, by way of nonlimiting examples, two embodiments thereof.

DETAILED DESCRIPTION OF PREFERRED EMBODIMENTS

Figure 1:
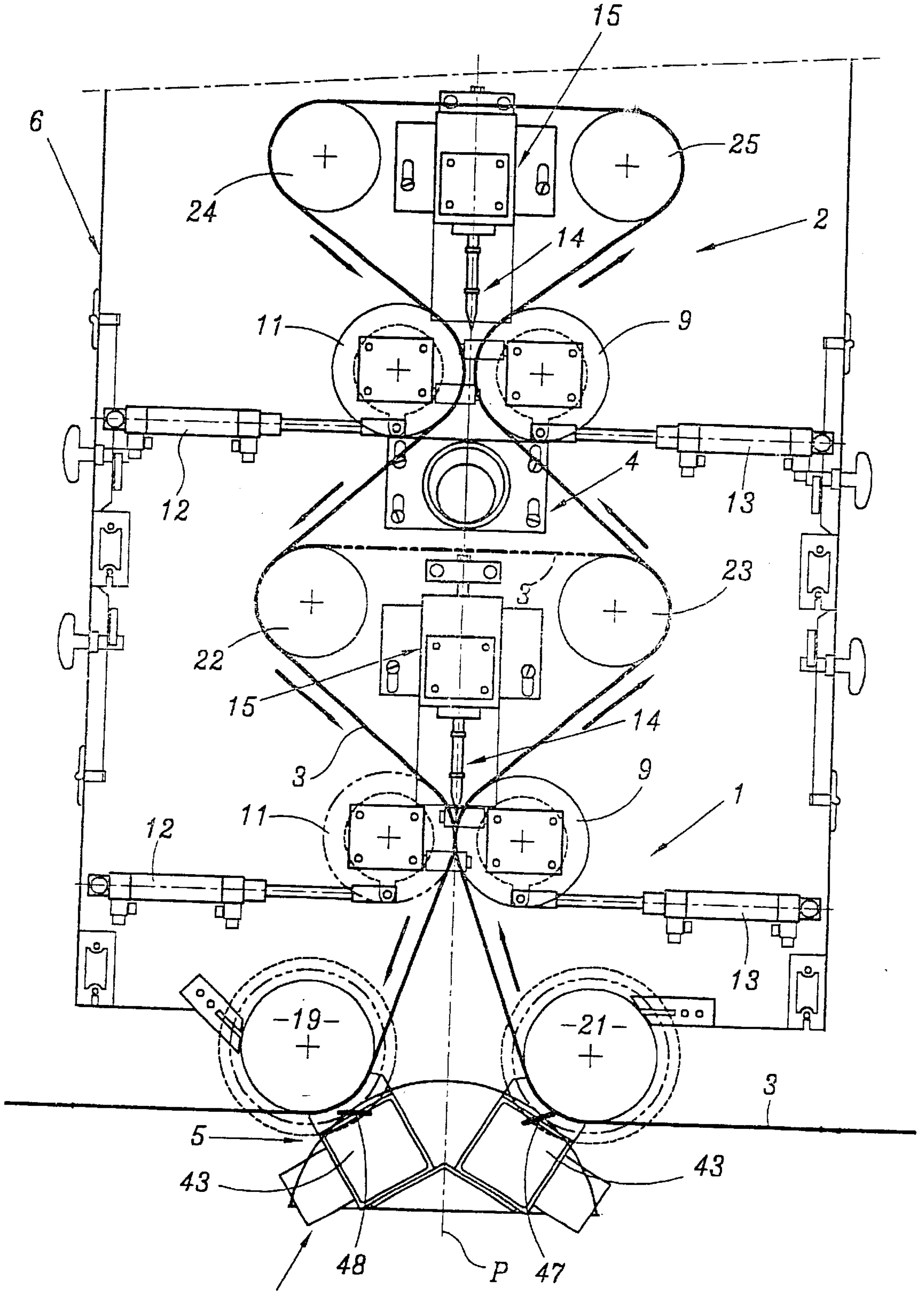
FIG. 1 is a simplified end elevation of one embodiment of the device for the surface treatment of a polymer film according to the invention.

The device shown is intended for the surface treatment of substrates, for example polymer films, by an electrical discharge between two electrodes in a gas mixture liable to give rise to the formation of by-products during the treatment, for example in a gas mixture containing monosilane.

The embodiment shown here comprises two superposed stages (or zones) 1, 2 for treating the surface of a polymer film 3, a suction assembly 4 placed beneath the upper treatment stage 2 and a second assembly 5 for sucking out and for removing the gaseous effluents resulting from the treatment, said second assembly being placed beneath the first treatment stage 1.

The whole system is contained inside a cover 6, the film entering and leaving the system via the spaces left between the suction assembly 5 and, respectively, the deflector roll 21 and the deflector roll 19.

In the case of the embodiment shown, each treatment or discharge stage 1, 2 comprises two roller electrodes 9, 11 which are placed so as to be parallel with and near each other, with their longitudinal axis horizontal. These rollers 9, 11 therefore form two electrodes, made of a suitable metallic material. They may, at least in the case of one of them, be covered with a suitable dielectric material. Means, not shown and known per se, are provided in order to apply a high voltage (several thousands of volts) to the electrodes 9, 11 so as to cause an electrical discharge between them. In the present case, power cylinders 12, 13 are placed at the ends of each roller 9, 11, allowing the associated roller 11, 9 to be moved forward or back. This embodiment is merely an illustration of one of the possible ways of operating the system—it could in fact also be operated using fixed rollers.

Positioned above each pair of roller electrodes 9, 11, in a vertical plane passing through them, is an injector 14 for injecting a gas mixture coming from a gas chamber 15 placed above the injector 14 (reference 32 in FIG. 2), which injector and the associated chamber 15 preferably extend over the entire length of the respective rollers 9, 11.

The rollers 9, 11 are supported at their ends by opposite side walls 16, 17 of the cover 6 and may be rotated by the film 3, the latter itself being driven by a motor drive system (not shown).

By way of illustration, it should be pointed out that the system may equally well operate with roller electrodes driven by a motor or just simply by the film itself (depending on the film in question and on its mechanical strength properties).

In the present case, two deflector rolls 19, 21 are placed beneath the first treatment stage 1. A second pair of deflector rolls 22, 23 is placed above the first discharge zone 1, and finally two deflector rolls 24, 25 are mounted above the roller electrodes 9, 11 of the second discharge zone 2.

Each deflector roll (19, 21, 22, 23 etc.) is driven here by a motor (not shown) so that the film 3 runs more easily. Here too, the deflector rolls could be driven by the film itself in certain cases.

As may be seen in FIG. 1, the film 3 enters the cover 6 via the slot formed between the roll 21 and the assembly 44, which will be described later, then is applied against the first deflector roll 21, next passes between the two electrodes 9, 11 of the first discharge stage 1 and from there the film 3 runs over the deflector roll 23, located above the discharge stage 1, is then applied against the roller electrode 9 of the upper stage 2 and then against the upper deflector roll 25. Next, the film is sent back by the deflector roll 24 to the roller electrode 11 and then applied against the deflector roll 22, from where it is sent back to the roller electrode 11 of the first stage. After this, the film is removed via the exit slot formed between the lower deflector roll 19 and the suction assembly 44.

Thus, in this embodiment comprising two discharge zones or stages 1, 2, the film 3 undergoes four consecutive phases of treatment by an electrical discharge, for example a corona discharge, between the electrodes 9, 11 of the two stages.

However, it will be understood that it is obviously not absolutely essential for the device to comprise two discharge stages 1, 2, it being possible for a single stage 1 to suffice for a good number of applications. In such a simplified, one-stage version, the film 3 passes directly from the deflector roll 23 to the deflector roll 22 before being sent back into the interelectrode space where it undergoes a second surface treatment before emerging from the cover via the deflector roll 19.

Each chamber 15 is supplied, at least at one of its ends, with a gas mixture via a pipe passing through the wall of the cover 6. From this compartment the gas mixture enters the injection nozzle 14 which here extends continuously from one end of the gas chamber 15 and of the roller electrodes to the other. The nozzle 14 may be fixed under the chamber 15 by any suitable means known to those skilled in the art.

Figure 2:
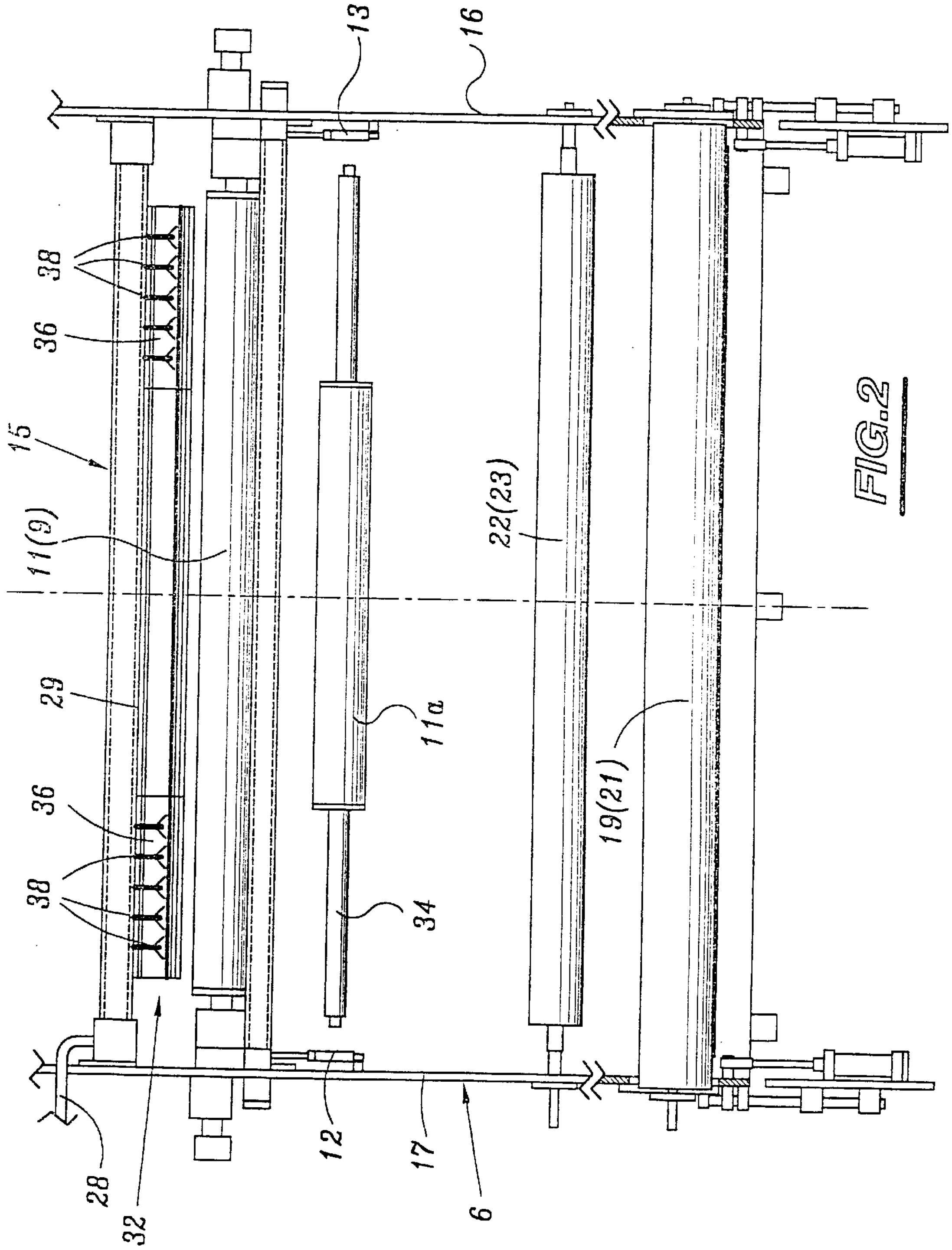
FIG. 2 is a partial longitudinal elevation of the device in a plane perpendicular to that of FIG. 1, certain elements of the device not being shown for the sake of simplifying the drawing.
Figure 5:
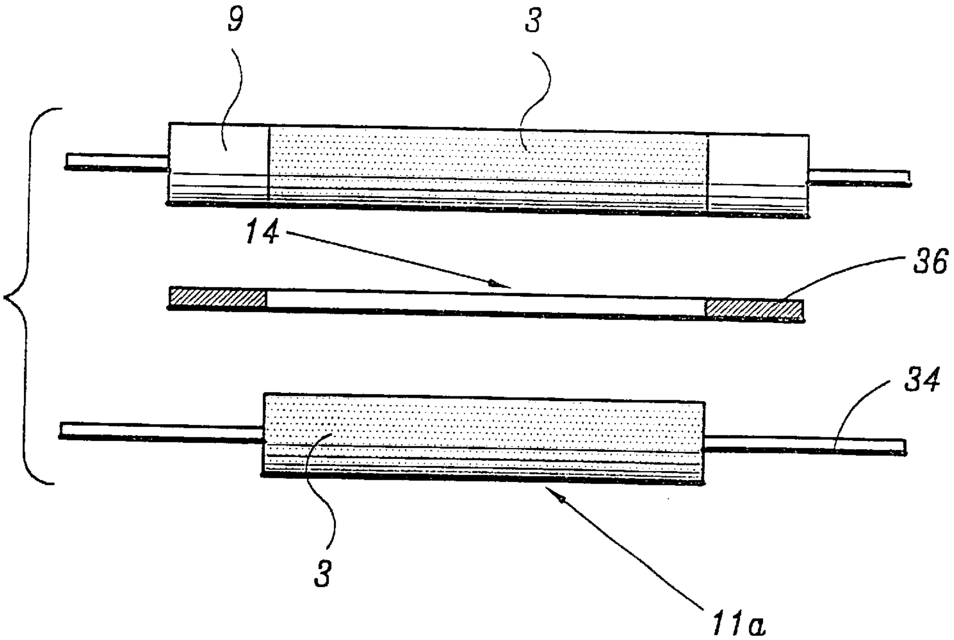
FIG. 5 is a simplified top view of a second embodiment of the roller electrodes.

Furthermore, the gas injection nozzle here is provided, very advantageously, with means allowing part of the length of this nozzle to be occluded so as to limit the length over which the gas mixture is injected. This is because it is then possible to tailor this gas injection length to the width of the film 3 to be treated, when this width is less than the length of the roller electrode 9. Thus, FIGS. 2 and 5 show a roller 11*a* forming a roller electrode held by a longitudinal shaft 34 whose ends are supported by the side walls 16, 17 of the cover 6, the length of the roller 11*a* then being equal to the width of the film 3 to be treated.

In order to tailor the effective gas injection length to the width of the film 3, the aforementioned means may comprise, for example, as in the present case, slats 36 hinged to the nozzle 32, each being provided with a curved end in order to close off the injection slot of the nozzle 32, and with operating hooks 38. The upper ends of the latter may be hooked onto a retaining member.

Several slats 36 may thus be spaced out along the injector 32 so as to adjust its effective injection length.

Figure 3:
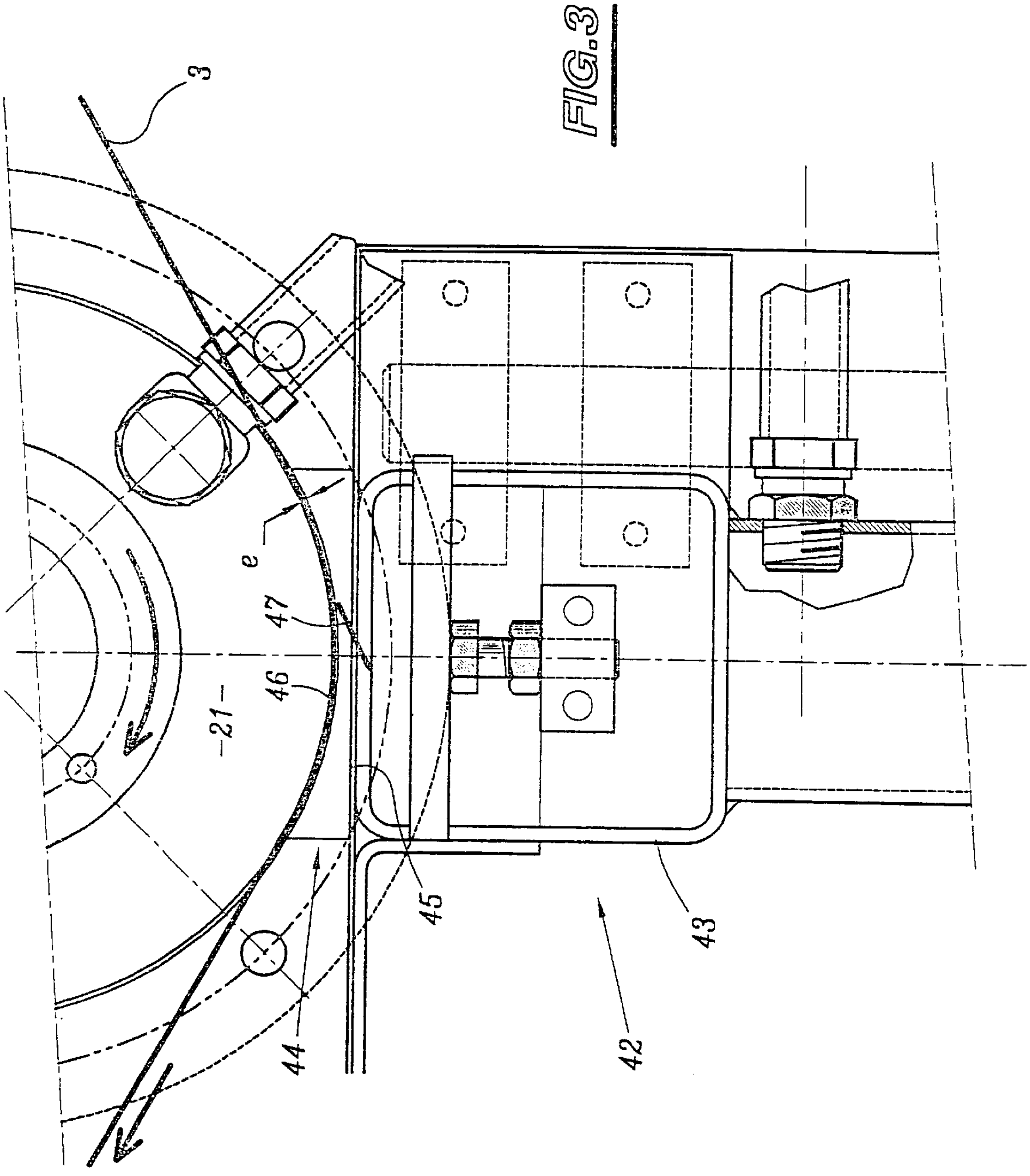
FIG. 3 is a partial elevation on an enlarged scale of the lower part of the device of FIGS. 1 and 2.
Figure 4:
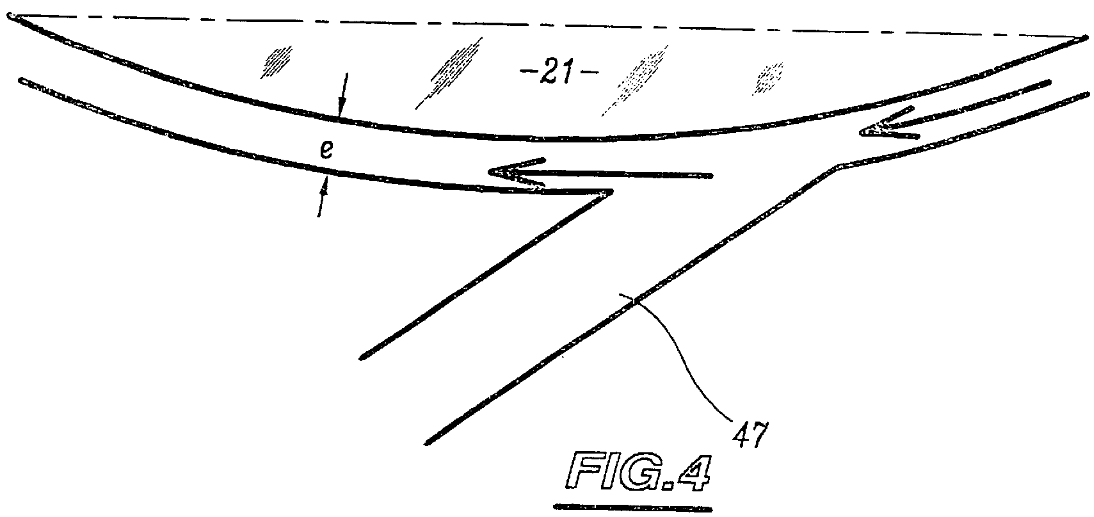
FIG. 4 is a partial cross section on an enlarged scale of a detail of FIG. 3.

Finally, the treatment device is provided, at its lower part beneath the deflector rolls 19, 21, with a unit 42 (FIGS. 1 and 3) for sucking out the gaseous effluents arising from the electrical discharges and for sucking out the air entrained at the surface of the film 3 due to its displacement. The suction unit 42 comprises, associated with each roll 19/21, an assembly 43 and an intermediate assembly 44 interposed between the assembly 43 and the roll (19, 21). Each intermediate assembly 44 has a lower face 45, which bears on the end of the assembly 43 and which may be plane, and a concave upper face 46 forming a cylindrical portion conjugate with the cylindrical surface of the associated roll (19, 21). A suitable gap e (FIG. 5) is provided between the surface of the roll 19, 21 and the cylindrical surface 46, the film 3, held applied against the surface of the respective roll 19, 21, passing through this gap.

A respective slot 47, 48 for sucking out the gaseous effluents resulting from. the treatment and for sucking out the air entrained by the film due to its running movement is made in each assembly 44, this slot 47, 48 emerging in the assembly 43. The two slots 47, 48 are placed opposite the rolls 21 and 19, respectively.

It is thus possible to suck out the air and the gaseous effluents into the assembly 43, which is connected to suction and extraction fans (not shown).

With regard to means for injecting the gas mixture, it will be preferred to try to obtain a homogeneous diffusion of the gas mixture over the entire length of the injector, for example by producing a head loss between the chamber and the nozzle, for example by the use of a porous body or a suitable fabric.

Although the present invention has been described in relation to particular embodiments, it is not in any way limited thereby but is, on the contrary, susceptible to modifications and to variants which will be apparent to those skilled in the art.

Thus, for example, although FIG. 1 describes, for the sake of clarity of the drawing and of the text, most particularly a vertical arrangement of the discharge zones, and therefore of the movement of the film through the space, it may be imagined that any other type of arrangement of the discharge zones (a vertical, horizontal or mixed arrangement) is conceivable, the entire arrangement being to provide the deflector rolls necessary for bringing the substrate to be treated into the discharge zone or zones and therefore, in particular when the device comprises several discharge zones, to transport it between each discharge zone.

Likewise, although the operations to be carried out between two treatments have not been described in detail above, it is considered, for example, to be advantageous, before opening the cover structure described above, and depending on the nature of the atmosphere which was used for the treatment, to carry out a purge using an inert gas, the purge/suction combination ensuring, as is the case conventionally, that the normally recommended safety conditions are met.

What is claimed is:

1. A process for treating a surface of a running substrate by an electrical discharge created between two roller electrodes, comprising a first roller electrode and a second roller electrode, in a gas mixture comprising the steps of:

passing said substrate in between said two roller electrodes by applying said substrate against the first roller electrode;

injecting the gas mixture between the roller electrodes to apply a first surface treatment to the substrate by the electrical discharge between the two electrode rollers, wherein the surface to be treated is exposed to said gas mixture injection;

passing said substrate in between said two roller electrodes by applying said substrate against the second roller electrode;

injecting the gas mixture between the roller electrodes to apply a second surface treatment to the substrate by the electrical discharge between the two roller electrodes, wherein the surface to be treated is exposed to said gas mixture injection.

2. The process as claimed in claim 1, wherein each of the first and second roller electrodes comprises a longitudinal treatment section defined by a presence of said electrical discharge with said gas mixture and wherein the substrate to be treated has a width at least equal to that of the longitudinal treatment sections of the first and second roller electrodes.

3. The process as claimed in claim 1, further comprising the step of deflecting said substrate with at least two pairs of deflector rolls, each of said pairs comprising a first deflector roll and a second deflector roll, by applying the substrate against the first deflector roll of the first pair of deflector rolls so as to deflect said substrate, then passing said substrate between the two roller electrodes by applying said substrate against the first roller electrode of said two electrodes, where said substrate undergoes said first surface treatment;

applying the substrate against the first deflector roll of the second pair of deflector rolls so as to deflect said substrate before applying said substrate against the second deflector roll of the second pair of deflector rolls so as to deflect said substrate;

then passing the substrate again between the two roller electrodes by applying said substrate against the second roller electrode of said two electrodes, where said substrate undergoes said second surface treatment, before applying said substrate against the second deflector roll of the first pair of deflector rolls so as to deflect said substrate.

4. The process as claimed in claim 1, further comprising a second stage for treating the substrate, said second stage comprising two additional surface treatments of the surface of the substrate between said first surface treatment of the substrate and said second surface treatment of the substrate, wherein said second treatment stage comprises the steps of:

passing said substrate, after having undergone said first surface treatment and before undergoing said second surface treatment, between two roller electrodes of the second stage, by applying said substrate against a first roller electrode of the second stage, where said substrate undergoes a first additional surface treatment;

passing the substrate a second time between the two roller electrodes of the second stage, by applying said substrate against the second roller electrode of the second stage, where said substrate undergoes a second additional surface treatment.

5. The process as claimed in claim 1, wherein at least one of the electrodes of said two electrodes has a length so as to be covered by the width of the substrate to be treated.

6. The process as claimed in claim 1, further comprising the step of injecting the gas mixture between the two roller electrodes, over an injection length substantially equal to the width of the substrate to be treated.

7. The process as claimed in claim 1 wherein said process is carried out at about atmospheric pressure.

* * * * *